United States Patent
De Laet et al.

(10) Patent No.: US 12,098,745 B2
(45) Date of Patent: Sep. 24, 2024

(54) PIVOTING THRUST WASHER

(71) Applicants: ZF Friedrichshafen AG, Friedrichshafen (DE); ZF WIND POWERANTWERPEN N.V., Lommel (BE)

(72) Inventors: Wim De Laet, Antwerp (BE); Andy Maes, Sinaa (BE); Jan Aerts, Friedrichshafen (DE)

(73) Assignees: ZF FRIEDRICHSHAFEN AG, Friedrichshafen (DE); ZF WIND POWER ANTWERPEN N.V., Lommel (BE)

( * ) Notice: Subject to any disclaimer, the term of this patent is extended or adjusted under 35 U.S.C. 154(b) by 286 days.

(21) Appl. No.: 17/600,623

(22) PCT Filed: Mar. 3, 2020

(86) PCT No.: PCT/EP2020/055526
§ 371 (c)(1),
(2) Date: Oct. 1, 2021

(87) PCT Pub. No.: WO2020/207666
PCT Pub. Date: Oct. 15, 2020

(65) Prior Publication Data
US 2022/0145930 A1    May 12, 2022

(30) Foreign Application Priority Data

Apr. 9, 2019  (DE) .................... 10 2019 205 087.5

(51) Int. Cl.
*F16C 17/04*   (2006.01)
*F16H 57/04*   (2010.01)
*F16H 57/08*   (2006.01)

(52) U.S. Cl.
CPC ......... *F16C 17/04* (2013.01); *F16H 57/0479* (2013.01); *F16C 2361/61* (2013.01); *F16H 2057/085* (2013.01)

(58) Field of Classification Search
CPC ....................................................... F16C 17/04
See application file for complete search history.

(56) References Cited

U.S. PATENT DOCUMENTS 2,872,256 A * 2/1959 Thomson ................ F16C 17/04
                                                        384/420
6,273,685 B1   8/2001 Kuhn
(Continued)

FOREIGN PATENT DOCUMENTS

DE    1177421 B    9/1964
DE    1986278 U    5/1968
(Continued)

OTHER PUBLICATIONS

Translation of WO2018059984 obtained Sep. 7, 2023.*

*Primary Examiner* — James Pilkington
(74) *Attorney, Agent, or Firm* — LEYDIG, VOIT & MAYER, LTD.

(57) ABSTRACT

A unit includes a thrust washer having a first abutment and a second abutment. The thrust washer is configured to be moved, by rotation, between a first position in which the thrust washer abuts the first abutment and a second position in which the thrust washer abuts the second abutment. The first abutment and the second abutment are formed by at least one pin and at least one recess. The pin is configured to engage in the recesses, and the recess is designed as a groove that extends tangentially around an axis of rotation of a component that is rotatably mounted by way of the thrust washer.

7 Claims, 2 Drawing Sheets

(56) References Cited

U.S. PATENT DOCUMENTS

| | | | |
|---|---|---|---|
| 8,932,177 B2 * | 1/2015 | Suzuki | F16C 33/08 |
| | | | 475/346 |
| 2005/0143215 A1 | 6/2005 | Fugel | |
| 2007/0117675 A1 | 5/2007 | Kim | |
| 2013/0217535 A1 | 8/2013 | Suzuki et al. | |

FOREIGN PATENT DOCUMENTS

| | | | |
|---|---|---|---|
| DE | 19954636 A1 | | 5/2001 |
| DE | 10243555 A1 | | 4/2004 |
| DE | 102005004488 A1 | | 8/2006 |
| DE | 102008000279 A1 | | 8/2009 |
| DE | 102016219008 A1 | | 4/2018 |
| EP | 1470348 B1 | | 11/2005 |
| JP | 2001173670 A | | 6/2001 |
| KR | 19980037005 U | | 9/1998 |
| WO | WO2018059984 | * | 4/2018 |

* cited by examiner

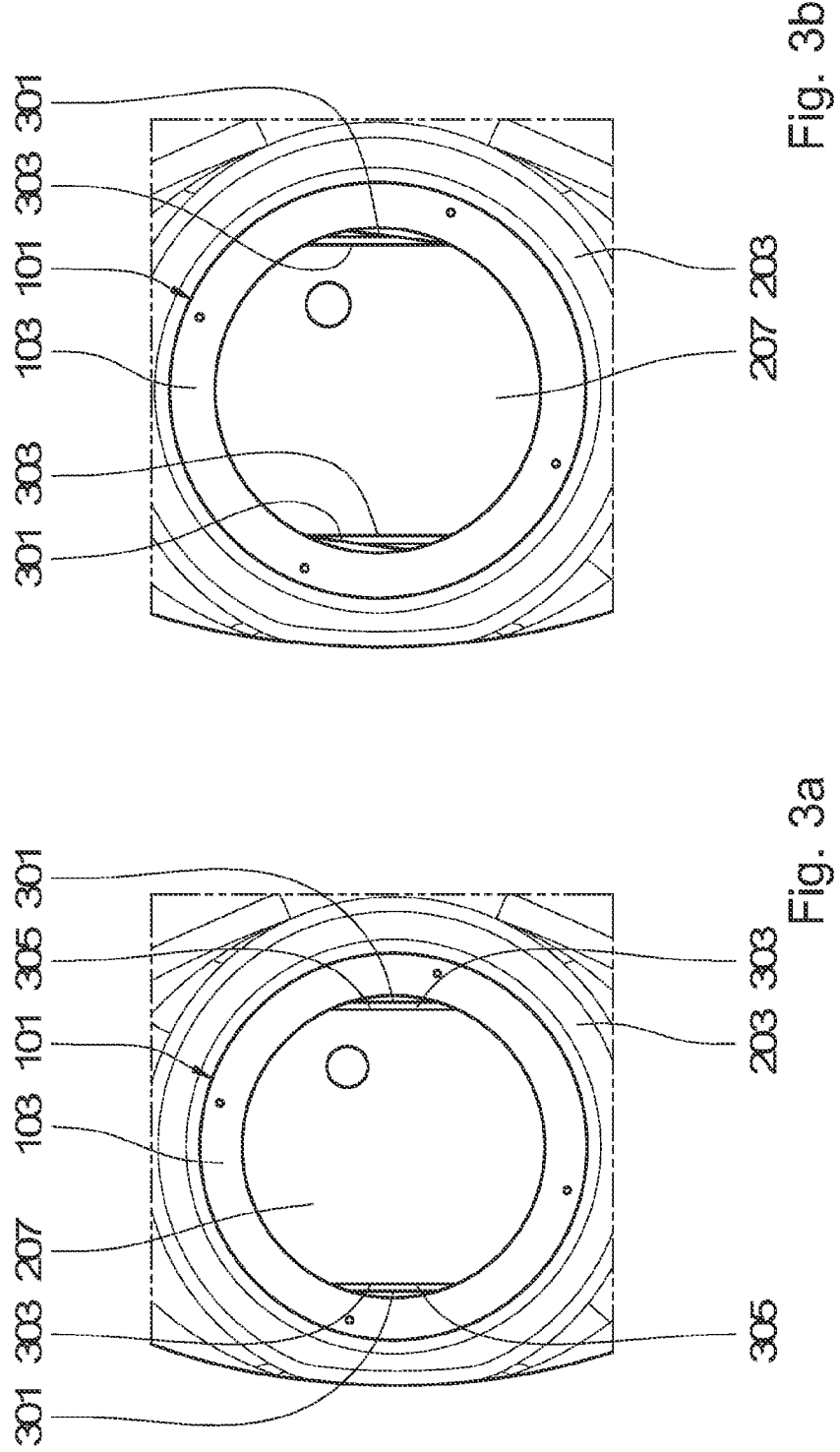

PIVOTING THRUST WASHER

This application is a U.S. National Phase application under 35 U.S.C. § 371 of International Application No. PCT/EP2020/055526, filed on Mar. 3, 2020, and claims benefit to German Patent Application No. DE 10 2019 205 087.5, filed on Apr. 9, 2019. The International Application was published in German on Oct. 15, 2020 as WO 2020/207666 A1 under PCT Article 21(2).

FIELD

The disclosure relates to a unit that includes a thrust washer.

BACKGROUND

So-called thrust washers are known from the prior art. These can be used for mounting the planetary wheels in a planetary gear. The thrust washers are fixed in the planetary carrier. A bearing gap extends between a respective thrust washer and a planetary wheel. It is filled with lubricant so that liquid friction is present under normal operating conditions. Fluid friction is almost wear-free. When the gear starts up or comes to a standstill, however, dry or mixed friction cannot be avoided. This is accompanied by increased wear. The wear is concentrated in areas of the thrust washer that are subjected to increased loading due to the force conditions prevailing in the planetary gear. In these areas, the risk of bearing damage is particularly high.

SUMMARY

In an embodiment, the present disclosure provides a unit comprising a thrust washer having a first abutment and a second abutment. The thrust washer is configured to be moved, by rotation, between a first position in which the thrust washer abuts the first abutment and a second position in which the thrust washer abuts the second abutment. The first abutment and the second abutment are formed by at least one pin and at least one recess. The pin is configured to engage in the recesses, and the recess is designed as a groove that extends tangentially around an axis of rotation of a component that is rotatably mounted by way of the thrust washer.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIGS. 3a and 3b show a flattened thrust washer.

DETAILED DESCRIPTION

Figure 1:
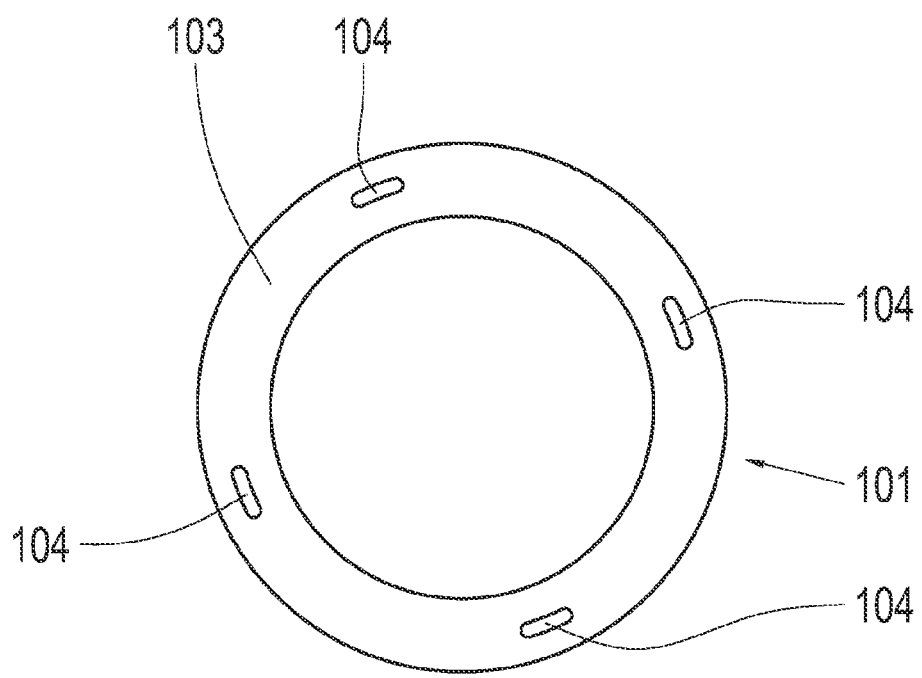
FIG. 1 shows a thrust washer.

The present disclosure provides a thrust washer that does not have disadvantages inherent in approaches known from the prior art. In particular, the present disclosure provides a thrust washer with increased load capacity and extended service life.

The present disclosure provides a unit that comprises a thrust washer. A thrust washer is a disk-shaped axial sliding bearing. Usually, a thrust washer has a hollow-cylindrical basic shape. The basic shape is thus a straight, hollow circular cylinder. The term "basic shape" of a body refers to the shape of an original body from which the aforementioned body is produced by eliminating individual regions, for example by inserting recesses and/or by adding individual regions.

According to the disclosure, the unit further comprises a first abutment and a second abutment. An abutment is a means for limiting the movability of a component in exactly one direction. The component can be moved in the exactly one direction until it abuts the abutment. From there, the component can be moved back in the opposite direction.

The first abutment is accordingly a means for limiting the rotational movability of the thrust washer in a first direction. The second abutment is designed as a means for limiting the rotational movability of the thrust disk in a second direction. The first direction and the second direction each denote the direction of a rotation of the thrust washer about the axis of rotation of a component, such as a gear wheel or a planetary wheel, which is rotatably mounted by means of the thrust washer. The first direction and the second direction are opposite one another.

When the thrust washer rotates in the first direction, it abuts the first abutment. When the thrust washer rotates in the second direction, it abuts the second abutment. A first position, in which the thrust washer abuts the first abutment, and a second position, in which the thrust washer abuts the second abutment, differ with respect to a rotation of the thrust washer about the aforementioned axis of rotation. The thrust washer can be transferred between the first position and the second position by rotation about this axis of rotation. A transfer of the thrust washer from the first position into the second position takes place by rotation in the second direction. Conversely, the thrust washer is transferred from the second position into the first position by rotation in the first direction.

The unit according to the disclosure results in an alternating rotation of the thrust washer between the first abutment and the second abutment under changing load situations, for example as a result of a reversal of the direction of rotation of a component rotatably mounted by means of the thrust washer.

Due to the rotational movement of the thrust washer, the regions in which the thrust washer is exposed to increased loading "migrate" over the thrust washer. As a result, the wear of the thrust washer is distributed more evenly over the running or sliding surface thereof. As a result, zones having locally increased wear are prevented from forming on the thrust washer. This increases the service life of the thrust washer and decreases the risk of wear-related failure.

The unit according to the disclosure is suitable, in particular, for use in a gearbox of a wind turbine. At least one planetary wheel is rotatably mounted by means of the thrust washer. The planetary wheel can be rotated freely in relation to the planetary carrier and the thrust washer. A bearing gap, which is preferably filled with lubricant, extends accordingly between the planetary wheel and the thrust washer. The first and second abutments limit the ability of the thrust washer to turn relative to the planetary carrier.

In a preferred refinement, the unit has at least one pin and at least one recess. The pin engages in the recess. The pin and the recess are arranged off-center, i.e., at a distance from the aforementioned axis of rotation. The recess runs tangentially, i.e., along a circular arc, around the axis of rotation. The circular arc is arranged in a radially oriented plane, i.e., extending orthogonally to the axis of rotation. The central angle of the circular arc is less than 360°. The central angle is preferably less than 90°, in particular less than 45°. The recess can be a groove or a continuous recess. Due to the off-center arrangement, the recess and the pin form the first and second abutments.

In a further preferred refinement, the thrust washer has the recess and can be turned with respect to the pin. If the unit is part of a planetary gear as described above, the planetary carrier can form the pin, preferably in one piece.

As an alternative and likewise preferably, the unit can be refined in such a way that the thrust washer forms the pin and can be turned with respect to the recess. The pin is preferably integrated into the thrust washer rigidly, i.e., immovably or without the possibility of relative movement. In particular, the thrust washer can form the pin in one piece. If the unit is part of the planetary gear unit, the planetary carrier preferably has the recess.

Instead of a recess and a pin, the first abutment and the second abutment can, in an alternative preferred refinement, be formed by a first and a second straight or flat surface. The thrust washer forms the first surface and can be turned with respect to the second surface. If the unit is part of a planetary gear, the planetary carrier preferably forms the second surface.

The first surface and the second surface are arranged radially offset from one another with respect to the aforementioned axis of rotation, i.e., along a straight line that runs orthogonally to the aforementioned axis of rotation and intersects the axis of rotation. Furthermore, the first surface and the second surface are oriented toward one another so that a gap extends between the first surface and the second surface.

The gap allows the first surface and the second surface to turn relative to one another, and thus allows the thrust washer to turn. However, since the surfaces are straight, they come in contact with one another as a result of the turning. This limits the ability of the thrust washer to turn.

The thrust washer 101 shown in FIG. 1 has an annular running surface 103. In each cross-section extending parallel to the image plane of FIG. 1, the thrust washer 101 has an annular basic shape. In particular, the running surface has an annular basic shape.

Four elongated recesses 104 are introduced into the thrust washer 101. Each recess 104 opens into a radially extending portion of the surface of the thrust washer 101.

Figure 2:
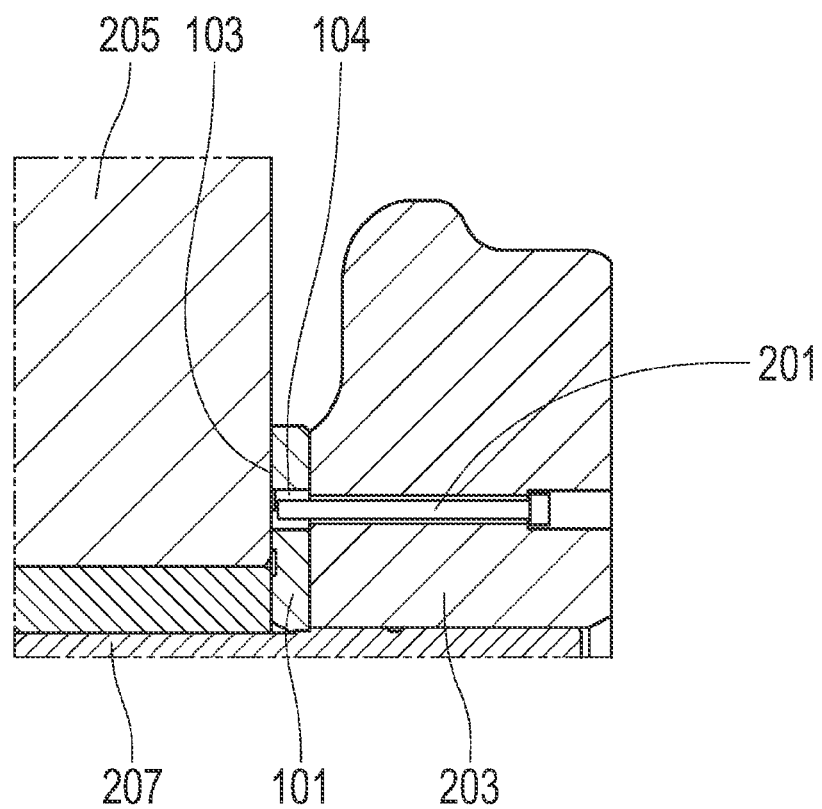
FIG. 2 shows a cross section with the thrust washer and a planetary carrier.

As is shown in FIG. 2, a respective pin 201 engages in the recesses. The pins 201 are fixed in a planetary carrier 203, thus acting as an anti-turn mechanism for the thrust washer 101. However, due to the elongated shape of the recesses 104, the thrust washer 101 can be turned by a limited angular range relative to the planetary carrier 203.

The thrust washer 101 forms an axial sliding bearing for a planetary wheel 205, which is rotatably mounted on a planetary pin 207. Load changes of the planetary wheel 205 cause the thrust washer 101 to turn, to the extent this is permitted by the recesses 104 and the pins 201. This prevents the wear of the thrust washer 101 from being concentrated in a narrowly defined area.

FIGS. 3a and 3b show an alternative exemplary embodiment. In this exemplary embodiment, the anti-turn mechanism of the thrust washer 101 is formed by straight surfaces. On the inner lateral surface, the thrust washer 101 includes two flattened regions 301, which are directed inwardly toward the axis of rotation of the planetary wheel 205.

The planetary pin 207 includes two flattened regions 303 corresponding thereto, which are correspondingly directed outwardly away from the axis of rotation. A flattened region 301 of the thrust washer 101 and a flattened region 303 of the planetary pin 207 are in each case situated opposite one another.

When the thrust washer 101 is in the angular position shown in FIG. 3a, the flattened region 301 of the thrust washer 101 and the flattened region 303 of the planetary pin 207 run parallel to one another. A gap 305 extends between the flattened region 301 of the thrust washer 101 and the flattened region 303 of the planetary pin 207.

The gap 305 allows the thrust washer 101 to turn. As a result of such turning, the flattened region 301 of the thrust washer 101 and the flattened region 303 of the planetary pin 207 come in contact with one another. This is shown in FIG. 3b. An abutment is formed by the contact of the flattened regions 301, 303, which limits the ability of the thrust washer 101 to turn.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS

101 Thrust washer
103 Running surface
104 Recess
201 Pin
203 Planetary carrier
205 Planetary wheel
207 Planetary pin
301 Flattened region of the thrust washer
303 Flattened region of the planetary pin
305 Gap

The invention claimed is:

1. A unit comprising:
   a thrust washer having a first straight surface, the first straight surface forming a first abutment and a second abutment,
   wherein the thrust washer is configured to be moved, by rotation, between a first position in which the thrust washer abuts a second straight surface and a second position in which the thrust washer abuts the second straight surface, and
   wherein the first straight surface and the second straight surface are arranged radially offset from one another.

2. The unit of claim 1, wherein the thrust washer has a third straight surface, and
   wherein the thrust washer abuts a fourth straight surface in the first position and abuts the fourth straight surface in the second position, and
   wherein the third straight surface and the fourth straight surface are arranged radially offset from one another.

3. The unit of claim 2, wherein the first straight surface and the third straight surface are arranged opposite one another relative to a radial center of the thrust washer.

4. The unit of claim 1, further comprising a planetary wheel,
   wherein the first straight surface is arranged on an inner lateral surface of the thrust washer and faces inwardly toward an axis of rotation of the planetary wheel.

5. The unit of claim 4, wherein the second straight surface faces outwardly away from the axis of rotation of the planetary wheel.

6. The unit of claim 1, wherein the second straight surface is arranged on a planetary pin.

7. The unit of claim 1, wherein the first straight surface and the second straight surface are parallel to one another in an intermediate position of the thrust washer between the first position and the second position.

* * * * *